US012634570B2

(12) United States Patent　　　　(10) Patent No.:　US 12,634,570 B2
Lee et al.　　　　　　　　　　　　(45) Date of Patent:　May 19, 2026

(54) CAMERA MODULE

(71) Applicant: SAMSUNG ELECTRO-MECHANICS CO., LTD., Suwon-si (KR)

(72) Inventors: Jae Sun Lee, Suwon-si (KR); Ji Hae Lee, Suwon-si (KR); Yeun Ho Jung, Suwon-si (KR); Ga Yeon Ju, Suwon-si (KR); Jang Hun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 227 days.

(21) Appl. No.: 17/490,216

(22) Filed: Sep. 30, 2021

(65) Prior Publication Data

US 2022/0279105 A1　　Sep. 1, 2022

(30) Foreign Application Priority Data

Feb. 26, 2021　(KR) ........................ 10-2021-0026523

(51) Int. Cl.
H04N 23/58　　　(2023.01)
G03B 11/00　　　(2021.01)
(Continued)

(52) U.S. Cl.
CPC ............. H04N 23/58 (2023.01); G03B 11/00 (2013.01); H04N 23/55 (2023.01); G02B 23/2484 (2013.01)

(58) Field of Classification Search
CPC ........ H04N 23/58; H04N 23/55; H04N 23/51; H04N 23/57; G03B 11/00; G03B 17/12;
(Continued)

(56) References Cited

U.S. PATENT DOCUMENTS

2006/0164539 A1*　7/2006　Van Arendonk ..... G02B 13/001
　　　　　　　　　　　　　　　　　348/340
2007/0065135 A1*　3/2007　Takei ....................... G03B 7/08
　　　　　　　　　　　　　　　　　348/E5.04
(Continued)

FOREIGN PATENT DOCUMENTS

CN　　104469105 A　　3/2015
CN　　105556385 A　　5/2016
(Continued)

OTHER PUBLICATIONS

Korean Office Action issued on Jun. 3, 2022, in counterpart Korean Patent Application No. 10-2021-0026523 (7 Pages in English, 5 Pages in Korean).

(Continued)

*Primary Examiner* — Sinh Tran
*Assistant Examiner* — Zhenzhen Wu
(74) *Attorney, Agent, or Firm* — NSIP Law

(57)　　　　　ABSTRACT

A camera module includes: a housing including a window through which light is incident and disposed on one surface of the housing, wherein a length of the housing in a first direction intersecting an optical axis is greater than a length of the housing in a second direction intersecting the optical axis; a filter member disposed on the window; an adhesive member configured to contact one side of the filter member; and a protrusion configured to surround another side of the filter member not in contact with the adhesive member.

18 Claims, 16 Drawing Sheets

IV-IV

(51) Int. Cl.
*H04N 23/55* (2023.01)
*G02B 23/24* (2006.01)

(58) Field of Classification Search
CPC ........ G03B 17/17; G03B 30/00; G03B 17/02;
G02B 23/2484
See application file for complete search history.

(56) References Cited

U.S. PATENT DOCUMENTS

| | | | |
|---|---|---|---|
| 2015/0042870 A1 | 2/2015 | Chan et al. | |
| 2015/0077840 A1 | 3/2015 | Kim et al. | |
| 2017/0353646 A1* | 12/2017 | Wang | H01L 27/14627 |
| 2018/0109660 A1* | 4/2018 | Yoon | H04N 23/687 |
| 2018/0120586 A1* | 5/2018 | Kim | G02B 27/646 |
| 2019/0004328 A1* | 1/2019 | Lee | G02B 13/0065 |
| 2019/0212632 A1 | 7/2019 | Miller et al. | |
| 2021/0018818 A1* | 1/2021 | Cha | G02B 27/646 |
| 2022/0342276 A1* | 10/2022 | Min | H04N 23/60 |
| 2022/0385795 A1* | 12/2022 | Park | G03B 30/00 |

| | | | | |
|---|---|---|---|---|
| 2023/0171475 A1* | 6/2023 | Jang | | H04N 23/54 |
| | | | | 348/373 |

FOREIGN PATENT DOCUMENTS

| | | | | |
|---|---|---|---|---|
| CN | 110868515 A | * | 3/2020 | |
| KR | 10-2015-0030906 A | | 3/2015 | |
| KR | 10-2016-0080626 A | | 7/2016 | |
| KR | 1020190111482 A | * | 10/2019 | |
| KR | 10-2020-0012421 A | | 2/2020 | |
| KR | 10-2020-0097766 A | | 8/2020 | |
| KR | 10-2131597 B1 | | 8/2020 | |
| KR | 10-2021-0000069 A | | 1/2021 | |
| WO | WO 2020/262876 A1 | | 12/2020 | |

OTHER PUBLICATIONS

Chinese Office Action issued on Mar. 25, 2024, in counterpart Chinese Patent Application No. 202111562987.2 (6 pages in English, 8 pages in Chinese).

* cited by examiner

I–I

II–II

III—III

IV—IV

CAMERA MODULE

CROSS-REFERENCE TO RELATED APPLICATIONS

This application claims the benefit under 35 U.S.C. § 119(a) of Korean Patent Application No. 10-2021-0026523 filed on Feb. 26, 2021 in the Korean Intellectual Property Office, the entire disclosure of which is incorporated herein by reference for all purposes.

BACKGROUND

1. Field

The following description relates to a camera module including an optical path changing unit.

2. Description of Related Art

Camera modules for telephoto or a long focal length imaging may be formed to have a significant size. For example, the size or length of a telephoto camera module may be greater than the size and length of a wide-angle camera module. A camera module for telephoto imaging or a long focal length imaging may include a plurality of bodies. For example, the telephoto camera module may include a first body accommodating a lens and a second body including an image sensor. The first body and the second body of the camera module may be coupled together by a fastening unit. For example, in a camera module mounted on a portable terminal, a first body and a second body may be coupled together with an adhesive, in consideration of lightweightedness and assembly convenience of the camera module. However, since bonding between the first and second bodies using an adhesive may cause an inflow of the adhesive, performance of the camera module may be impaired.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing including a window through which light is incident and disposed on one surface of the housing, wherein a length of the housing in a first direction intersecting an optical axis is greater than a length of the housing in a second direction intersecting the optical axis; a filter member disposed on the window; an adhesive member configured to contact one side of the filter member; and a protrusion configured to surround another side of the filter member not in contact with the adhesive member.

The filter member may be disposed to be biased toward one side of the housing in the second direction with respect to the window.

The window may be disposed biased toward one side of the housing in the second direction.

The housing may include a step on which the filter member is configured to be seated.

A thickness of the filter member in an optical axis direction may be greater than a depth of the step in the optical axis direction.

A deviation between the thickness of the filter member and the depth of the step in the optical axis direction may be 50 µm or less.

The camera module may further include a first optical path changing unit configured to refract or reflect light reflected from a subject to a lens module.

The camera module may further include a second optical path changing unit configured to refract or reflect light refracted through the lens module toward the window.

In another general aspect a camera module includes: a first body including a lens module, a first optical path conversion module disposed on an object side of the lens module, and a second optical path conversion module disposed on an image side of the lens module; a second body connected to the first body and having a window through which light projected from the first body is incident; a filter member disposed on the window; a protrusion disposed on the second body and configured to surround a portion of the filter member except for one side of the filter member; and an adhesive member disposed on the one side of the filter member.

The camera module may further include a receiving portion disposed on the first body and disposed to surround three different sides of the second body.

The camera module may further include a shielding member coupled to the first body.

The camera module may further include a substrate disposed on the second body and including an image sensor.

The camera module may further include a first driving unit configured to drive the first optical path conversion module.

The camera module may further include a second driving unit configured to drive the lens module in an optical axis direction of the lens module.

The adhesive member may be further disposed between the first body and the second body.

The adhesive member may be further disposed in a space defined between the protrusion and opposing surfaces of the first body and the second body.

Other features and aspects will be apparent from the following detailed description, the drawings, and the claims.

Figure 1:
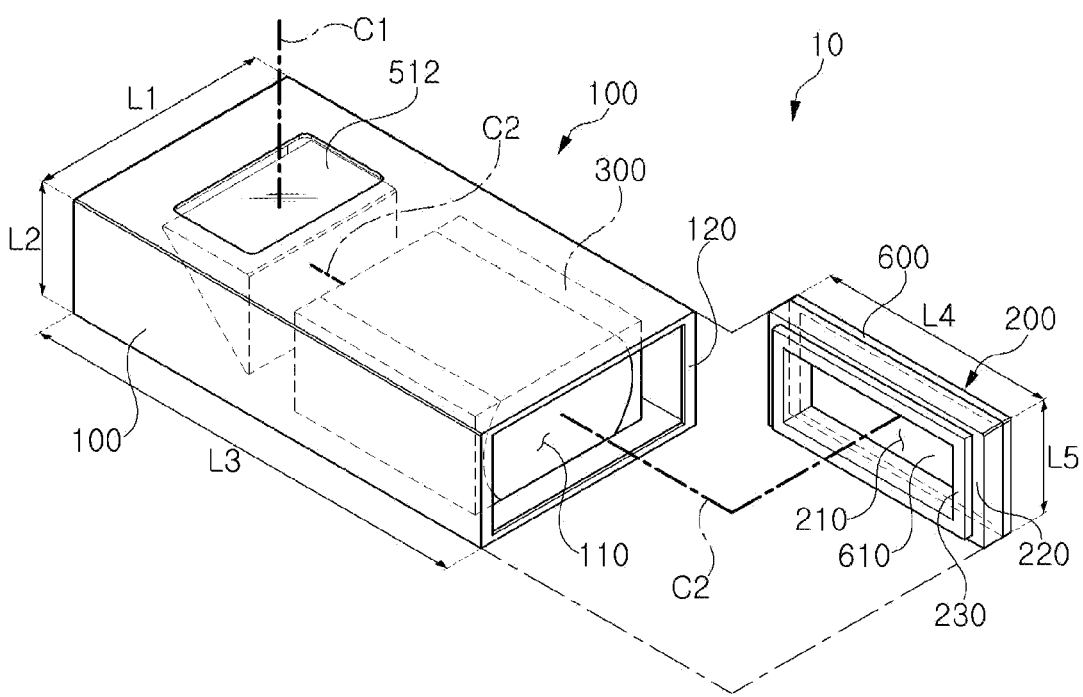
FIG. 1 is a partially exploded perspective view of a camera module, according to an example.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. In addition, hereinafter, the traversal cross-section means a cut surface in a direction intersecting the optical axis, and the longitudinal cross-section means a cut surface in a direction parallel to the optical axis.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

A camera module described herein may be mounted on a portable electronic product. For example, the camera module may be mounted on a portable phone, a notebook computer, or the like. However, the scope of use of the camera module according to examples disclosed herein is not limited to the above-described electronic device. For example, the camera module may be installed in any electronic device that requires screen capturing and video capturing, such as motion detection, image capturing, face recognition, iris recognition, virtual reality realization, augmented reality realization, and the like.

The camera module disclosed herein may be configured to have a long focal length. For example, the camera module may be configured to accommodate a telephoto optical imaging system. The camera module may be configured to be separable into a plurality of bodies for easy manufacturing and assembly. For example, the camera module may include a first body including a lens module and a second body including an image sensor so that an optical axis alignment operation between the lens module and the image sensor is possible. However, the separable configuration of the camera module is not limited to the first body and the second body. For example, the camera module may also be configured in the form of a first body including an optical path changing unit, a second body including a lens module, and a third body including an image sensor.

The camera module may be configured to be mounted on a thin portable terminal.

For example, the cross-section of the camera module may be formed to have a substantially rectangular shape. As another example, the cross-section of the first body and the cross-section of the second body may be formed to have a substantially rectangular shape. In more detail, in the cross-section of the first body and the second body, the length in the horizontal direction may be greater than the length in the vertical direction. In addition, the camera module may include a lens or a lens module in which a length in a first direction intersecting the optical axis and a length in a second direction intersecting the optical axis are different.

The camera module may be configured to facilitate coupling or bonding between the separated bodies. For example, the camera module may include a protrusion for forming a bonding space between the first body and the second body. The bonding space may be formed differently depending on the longitudinal direction of the body. For example, a size of the bonding space in a transverse direction of the first body and the second body may be wider than a size of the bonding space in a longitudinal direction of the first body and the second body. This configuration may be advantageous for thinning the camera module, since a vertical height of the camera module may be significantly reduced.

The first body may be configured to receive or include the lens module and a first optical path changing unit. For example, a space for accommodating the lens module and the first optical path changing unit may be formed in the first body. The first body may include a first coupling portion configured to be coupled to the second body. For example, the first coupling portion may be formed in a portion of the first body, facing the second body. A first window may be formed in the first coupling portion. The first window may enable movement of light from the first body toward the second body. For example, light refracted by the lens module may be projected in the direction of the second body through the first window. The first coupling portion may be formed to have different lengths in a horizontal direction and a vertical direction. For example, a length of the first coupling portion in a first direction intersecting the optical axis passing through the first window may be configured to be different from a length of the first coupling portion in a second direction intersecting the optical axis and the first direction.

The lens module may include a lens barrel and one or more lenses. For example, the lens module may include the lens barrel and four or more lenses accommodated in the lens barrel. The lens module may include a lens configured in such a manner that a length in the first direction intersecting the optical axis is different from a length in a second direction intersecting the optical axis and the first direction. For example, a lens disposed frontmost in the lens module may be configured such that the length in the first direction intersecting the optical axis and the length in the second direction intersecting the optical axis and the first direction are different from each other.

The first optical path changing unit is configured to convert the path of light incident in the camera module. For example, the first optical path changing unit may refract or reflect the path of light incident in a height direction of the camera module in a longitudinal direction of the camera module. The first optical path changing unit may be disposed on one side of the lens module. For example, the first optical path changing unit may be disposed on the object side of the lens module.

The second body may be configured to include an image sensor. For example, the second body may accommodate a substrate on which an image sensor is mounted or may be coupled to a substrate on which an image sensor is mounted. The second body may include a second coupling portion configured to be coupled to the first body. For example, the second coupling portion may be formed in a portion of the second body facing the first body. A second window may be formed in the second coupling portion. The second window may be formed to have substantially the same or similar size as the first window, and may be configured to face the first window. The second coupling portion may be formed to have different lengths in the horizontal direction and the vertical direction. In detail, a distance from a first side of the second window to a first side of the second coupling portion parallel to the first side of the second window may be different than a distance from a second side of the second window adjacent to the first side of the second window to a second side of the second coupling portion parallel to the second side of the second window.

The second body may include a configuration for substantially contacting the first body. For example, a protrusion may be formed on the second coupling portion of the second body. The protrusion may be configured to contact the first coupling portion of the first body. For example, the protrusion may be formed to be elongated in a direction from the second coupling portion to the first coupling portion. The protrusion may be configured to form a space between the first body and the second body. For example, the cross-sectional area of the protrusion may be smaller than the cross-sectional area of the first coupling portion and the cross-sectional area of the second coupling portion. The protrusion may be formed at an edge of the second window. For example, the protrusion may be formed along four sides of the second window. However, the protrusions are not necessarily formed on each of the four sides of the second window. For example, the protrusions may be formed only on two or three sides of the second window.

The second body may further include members in addition to the image sensor and the substrate. For example, the second body may further include a filter member. The filter member may be disposed on the second window. The filter member may be configured to block light of a specific wavelength. For example, the filter member may be configured to block infrared rays. However, the light blocked by the filter member is not limited to infrared rays. The filter member may be formed to have a shape similar to that of the second window. For example, the filter member may be formed in a rectangular shape. For example, a length of a first side of the filter member may be greater than a length of a second side of the filter member intersecting the first side. The filter member may be disposed to be surrounded by the protrusion. For example, the protrusion may be formed along the edge of the filter member to close at least three sides of the filter member.

The camera module may further include an adhesive member in one form for coupling the first body and the second body to each other. The adhesive member may be formed in an adhesive space formed between the first body and the second body.

FIG. 1 is a partially exploded perspective view of a camera module, according to an example Referring to FIG. 1, a camera module 10, according to an example, may include a first body 100 and a second body 200. However, the configuration of the camera module 10 is not limited to the first body 100 and the second body 200. For example, the camera module 10 may further include a substrate configured to be coupled to the second body 200.

The first body 100 may be configured to be coupled or bonded to the second body 200. For example, a first coupling portion 120 may be formed on one side or one end of the first body 100. The first coupling portion 120 may be formed to have substantially the same shape as or a shape similar to the cross-section of the first body 100. However, the shape of the first coupling portion 120 is not limited to the cross-sectional shape of the first body 100. A first window 110 may be formed in the first coupling portion 120. The first window 110 may function as a passage through which light incident into the first body 100 is projected onto the second body 200.

The first body 100 may be configured to enable the thinning of the camera module 10. For example, a length L2 of the first body 100 in the height direction may be less than a length L1 of the first body 100 in the width direction. The first body 100 may be configured to accommodate a long-focus optical imaging system (e.g., a telephoto optical imaging system). For example, a length L3 of the first body 100 in the direction of the optical axis C2 may have a significant size (e.g., twice or more a size of L1).

The first body 100 may include a configuration for refracting light reflected from a subject. For example, the first body 100 may include a lens module 300. However, the configuration of the first body 100 is not limited to the lens module 300. For example, the first body 100 may further include a first optical path changing unit 512.

The first optical path changing unit 512 may be configured to convert the optical path incident in the camera module 10. For example, the first optical path changing unit 512 may refract or reflect the path of light incident along the optical axis C1 in the optical axis C2 direction. The first optical path changing unit 512 may be disposed on one side of the lens module 300. For example, the first optical path changing unit 512 may be disposed on the object side of the lens module 300. The first optical path changing unit 512 may have a form capable of reflecting or refracting light. For example, the first optical path changing unit 512 may be a prism or a reflective mirror.

Next, the lens module 300 included in the first body 100 will be described with reference to FIG. 2.

Figure 2:
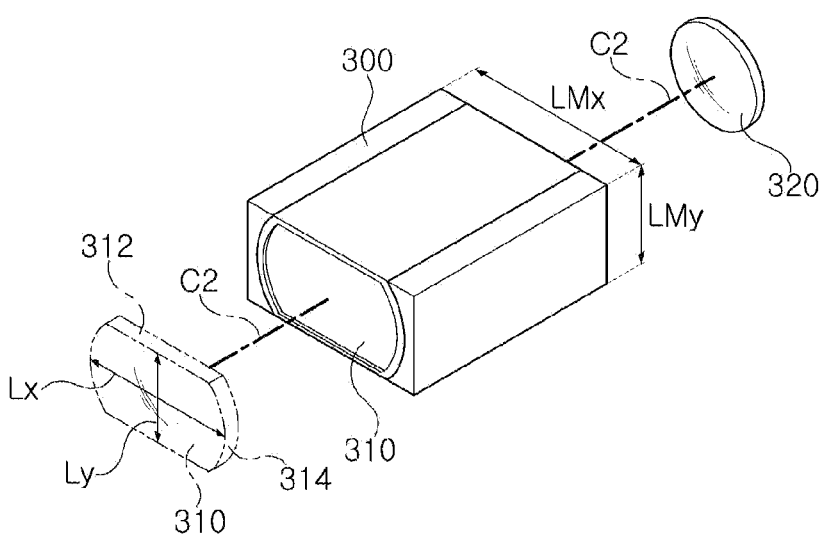
FIG. 2 is a perspective view of a lens module accommodated in a first body illustrated in FIG. 1.

Referring to FIG. 2, the lens module 300 may include one or more lenses 310. For example, the lens module 300 may include four or more lenses. However, the number of lenses included in the lens module 300 is not limited to four. For example, the lens module 300 may include 3 or fewer lenses, or 5 or more lenses.

The lens module 300 may be configured to have different lengths in the first direction and the second direction intersecting the optical axis C2. For example, a length LMx of the lens module 300 in the first direction may be greater than a length LMy of the lens module 300 in the second direction.

The lens module 300 may include the lens 310 having different lengths in the first direction and the second direction, intersecting the optical axis C2. For example, one or more lenses 310 included in the lens module 300 may have a length Lx in a first direction and a length Ly in a second direction, intersecting the optical axis C2, the length Lx and the length Ly being different from each other as illustrated in FIG. 2. However, not all lenses included in the lens module 300 are formed in the form of the one or more lenses 310. For example, some lenses 320 included in the lens module 300, may have a circular shape centered on the optical axis C2, as illustrated in FIG. 2.

The second body 200 of the camera module 10 will be described, referring back to FIG. 1.

As illustrated in FIG. 1, the second body 200 may be configured to be coupled or bonded to the first body 100. For example, a second coupling portion 220 may be formed on one side or one end of the second body 200. The second coupling portion 220 may be formed to have substantially the same shape or a shape similar to the cross-section of the second body 200. However, the shape of the second coupling portion 220 is not limited to the cross-sectional shape of the second body 200. A second window 210 may be formed in the second coupling portion 220. The second window 210 may function as a passage through which light projected from the first window 110 of the first body 100 is incident into the interior of the second body 200.

The second body 200 may be configured to enable thinning of the camera module 10. For example, a length L5 of the second body 200 in the height direction may be less than a length L4 of the second body 200 in the width direction.

The second body 200 may include a configuration for forming an image of light reflected from a subject. For example, the second body 200 may include an image sensor 610. However, the configuration of the second body 200 is not limited to the image sensor 610. For example, the second body 200 may further include a substrate on which the image sensor 610 is mounted.

The camera module 10 may further include a configuration capable of forming a separation space or an adhesive space between the first body 100 and the second body 200. For example, the camera module 10 may further include a protrusion 230 formed on the second body 200. The protrusion 230 may be formed at an edge of the second window 210. For example, the protrusion 230 may be formed to surround four sides of the second window 210. The protrusion 230 may be formed to have a predetermined height h toward the first body 100. The height h of the protrusion 230 may be increased or decreased as necessary.

Figure 3A:
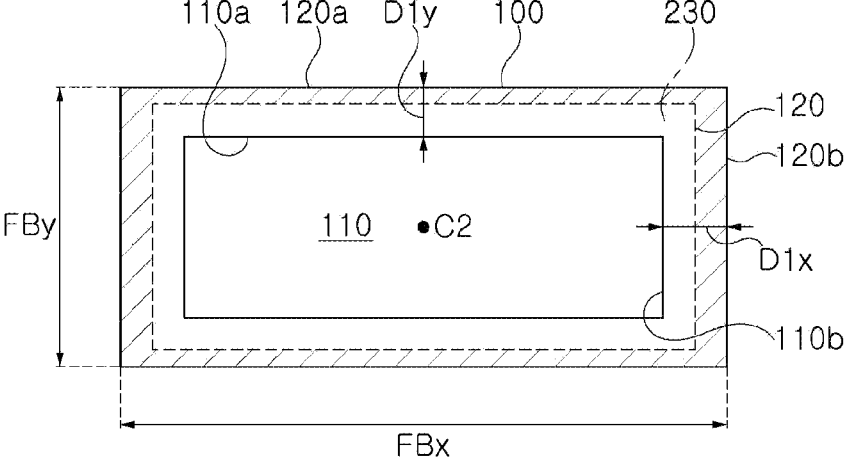
FIG. 3A is a plan view illustrating a coupling portion of the first body and a second body illustrated in FIG. 2.
Figure 3A:
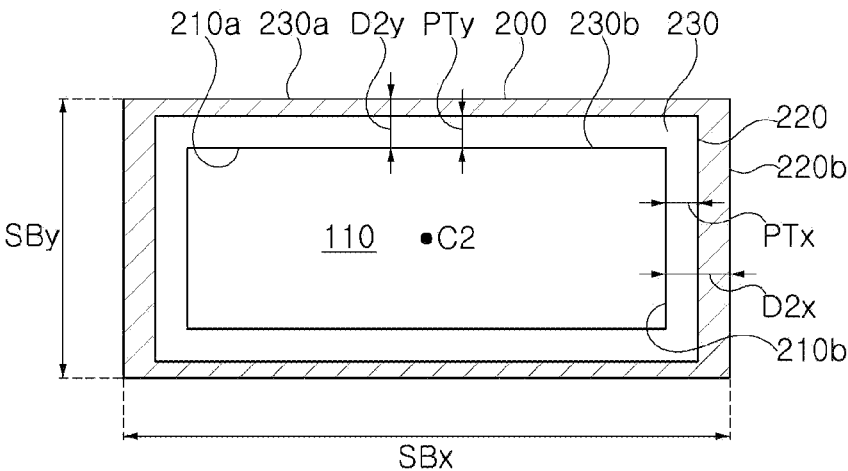

Next, example shapes of the first coupling portion 120 of the first body 100 and the second coupling portion 220 of the second body 200 will be described in more detail with reference to FIG. 3A.

The first coupling portion 120 and the second coupling portion 220 may be formed on the first body 100 and the second body 200, respectively. For example, the first coupling portion 120 may be formed on one side or one end of the first body 100, and the second coupling portion 220 may be formed on one side or one end of the second body 100.

The first coupling portion 120 and the second coupling portion 220 may be configured to face each other. For example, the first coupling portion 120 and the second coupling portion 220 may be configured to face each other at a predetermined distance in the coupled state of the first body 100 and the second body 200. A configuration for enabling light to be projected or incident may be formed in the first coupling portion 120 and the second coupling portion 220. For example, the first window 110 and the second window 210 may be formed in the first coupling portion 120 and the second coupling portion 220, respectively.

The first coupling portion 120 and the second coupling portion 220 may be configured to have different horizontal and vertical lengths. For example, a transverse length FBx of the first coupling portion 120 may be greater than a longitudinal length FBy, and a transverse length SBx of the second coupling portion 220 may be greater than a longitudinal length SBy.

The sizes or areas of the first coupling portion 120 and the second coupling portion 220 may be substantially the same or similar. For example, the transverse length FBx of the first coupling portion 120 is substantially the same as or similar to the transverse length SBx of the second coupling portion 220, and the longitudinal length FBy of the first coupling portion 120 may be substantially the same as or similar to the longitudinal length SBy of the second coupling portion 220. However, the sizes or areas of the first coupling portion 120 and the second coupling portion 220 are not necessarily the same or similar. For example, the size or area of the first coupling portion 120 may be larger than the size or area of the second coupling portion 220.

The first coupling portion 120 and the second coupling portion 220 may have different areas or sizes according to the first and second directions intersecting the optical axis C2. For example, a distance D1*y* from a first side 110*a* of the first window 110 to a first side 120*a* of the first coupling portion 120 adjacent to the first side 110*a* may be different from a distance D1*x* from a second side 110*b* of the first window 110 to a second side 120*b* of the first coupling portion 120 adjacent to the second side 110*b*. As another example, a distance D2*y* from a first side 210*a* of the second window 210 to a first side 220*a* of the second coupling portion 220 adjacent to the first side 210*a* may be different from a distance D2*x* from a second side 210*b* of the second window 210 to a second side 220*b* of the second coupling portion 220 adjacent to the second side 210*b*.

An adhesive member may be applied or formed on the first coupling portion 120 and the second coupling portion 220. However, in a case in which the adhesive member is directly applied to the first coupling portion 120 and the second coupling portion 220, the adhesive member may penetrate into the interior of the first body 100 through the first window 110 and the lens of the lens module may be contaminated, or the adhesive member may penetrate into the interior of the second body 200 through the second window 210 and the image sensor 300 may be contaminated. Therefore, the camera module 10 further includes a configuration for solving the above-described problems. For example, the camera module 10 may further include the protrusion 230 formed on the second body 200.

The protrusion 230 is configured to form a separation space or an adhesion space between the first coupling portion 120 and the second coupling portion 220. In addition, the protrusion 230 may be formed along the edge of the second window 210 to block penetration of the adhesive member through the second window 210. In addition, the protrusion 230 is configured to surround the edge of the first window 110 in a coupled state between the first body 100 and the second body 200, and penetration of an adhesive member through the first window 110 may also be prevented.

The protrusion 230 may form a space in which an adhesive member may be filled or formed between the first body 100 and the second body 200. For example, an adhesive member may be formed in a region (hatched portion) formed outside of the protrusion 230 in the first coupling portion 120 and the second coupling portion 220.

The protrusion 230 may be formed to have predetermined thicknesses (PTx, PTy). The thicknesses PTx and PTy of the protrusion 230 may be constant regardless of the horizontal and vertical directions of the second body 200. For example, the horizontal thickness PTx of the protrusion 230 and the longitudinal thickness PTy of the protrusion 230 may be substantially the same. However, the horizontal thickness PTx of the protrusion 230 and the longitudinal thickness PTy of the protrusion 230 are not necessarily the same. For example, the horizontal thickness PTx of the protrusion 230 may be thinner than the longitudinal thickness PTy such that a sufficient bonding space may be formed on the outside of the protrusion 230.

Second bodies 200-1 and 200-2, according to other examples, will be described with reference to FIGS. 3B and 3C.

First, the second body 200-1 will be described with reference to FIG. 3B.

Figure 3B:
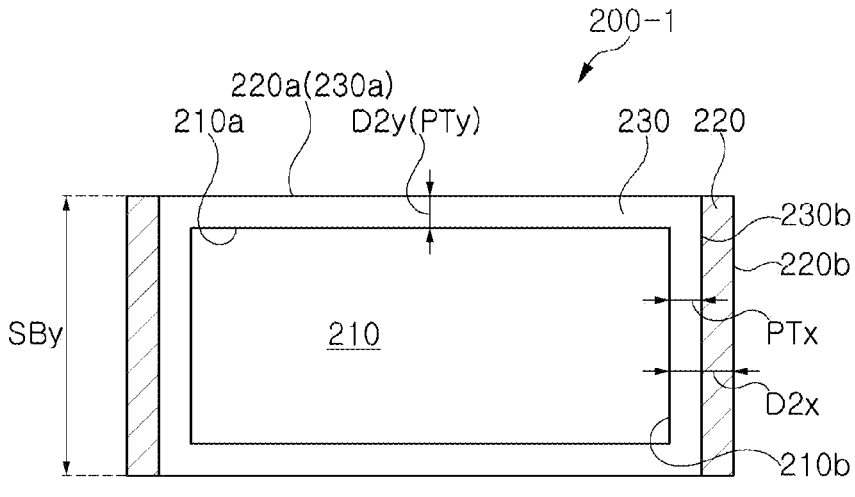
FIGS. 3B and 3C are plan views of coupling portions of second bodies, according to other examples.
Figure 3C:
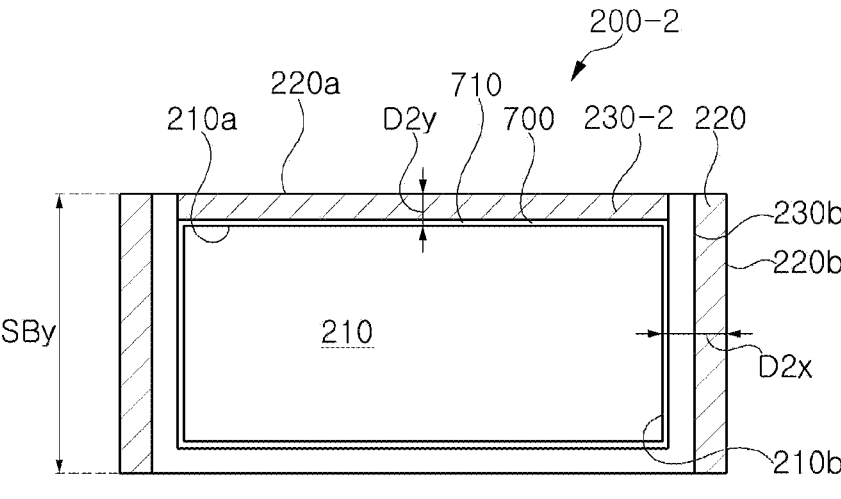

Referring to FIG. 3B, the second body 200-1 may be configured to limit a space in which the adhesive member may be formed. In more detail, a region (hatched portion) in which an adhesive member may be formed may be formed only between the second side 220*b* of the second coupling portion 220 and the second side 230*b* of the protrusion 230. In the second body 200-1 according to the first modified form, since there is no need to form a space in which the adhesive member may be formed between the first side 220*a* of the second coupling portion 220 and the first side 230*a* of the protrusion 230, the height SBy of the second body 200-1 may be lowered.

Next, the second body 200-2 will be described with reference to FIG. 3C.

The second body 200-2 may further include a filter member 700 disposed on the second window 210. The filter member 700 may be formed to be larger than the second window 210. Accordingly, an opening of the second window 210 may be completely blocked by the filter member 700. The filter member 700 may block the inflow of foreign substances or block the transmission of light of a specific wavelength. For example, the filter member 700 may be configured to block transmission of infrared rays.

The second body 200-2 may be distinguished from the above-described second bodies 200 and 200-1 in the shape of a protrusion 230-2. For example, the protrusion 230-2 may be formed to surround three sides of the second window 210 or three sides of the filter member 700. In detail, the protrusion 230-2 may not be formed on a first side 710 of the filter member 700.

In the second body 200-2, the adhesive member may be formed on the outside of the protrusion 230-2 and the outside of the filter member 700. In detail, the adhesive member may fill or be injected into a space (hatched portion) formed between the first side 220*a* of the second coupling portion 220 and the first side 710 of the filter member 700 and between the second side 220*b* of the second coupling portion 220 and the second side 230*b* of the protrusion 230-2.

In the second body 200-2, the formation of the protrusion 230-2 between the first side 220*a* of the second coupling portion 220 and the first side 710 of the filter member 700 may be omitted. Therefore, the height SBy of the second body 200-2 may be lowered. In addition, in the second body 200-2, since the adhesive member may fill a space between the first side 220*a* of the second coupling portion 220 and the first side 710 of the filter member 700, the bonding force between the first body 100 and the second body 200-2 by the adhesive member may be improved.

Figure 4:
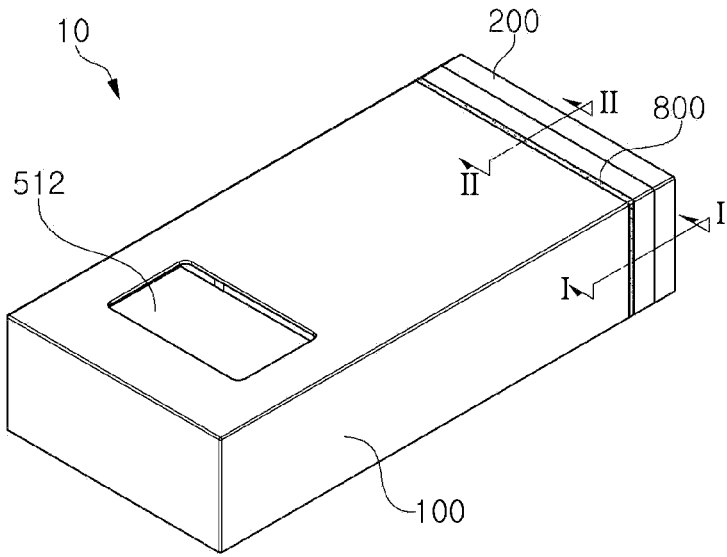
FIG. 4 is a perspective view of the camera module of FIG. 1 in a coupled form.
Figure 5A:
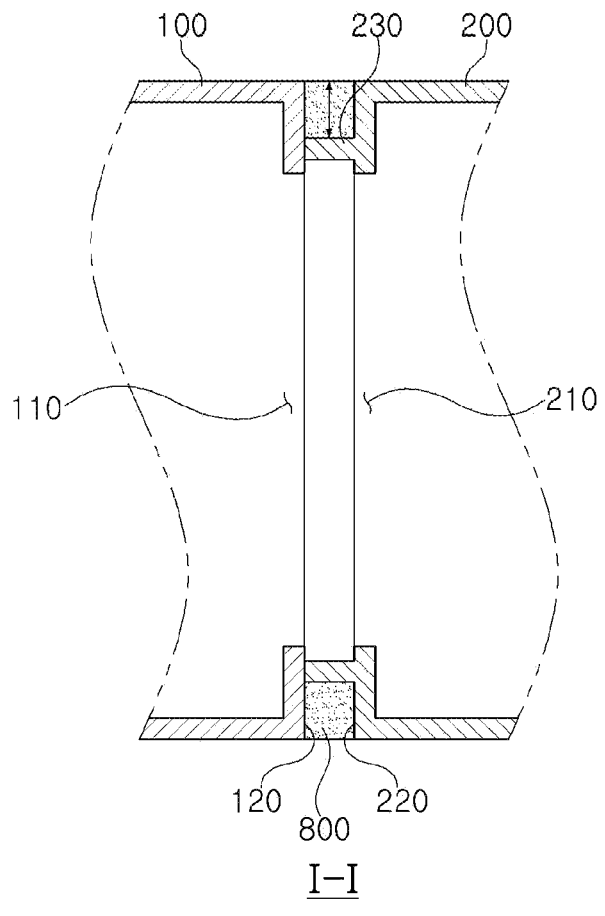
FIGS. 5A and 5B are partial cross-sectional views of the camera module illustrated in FIG. 4.
Figure 5B:
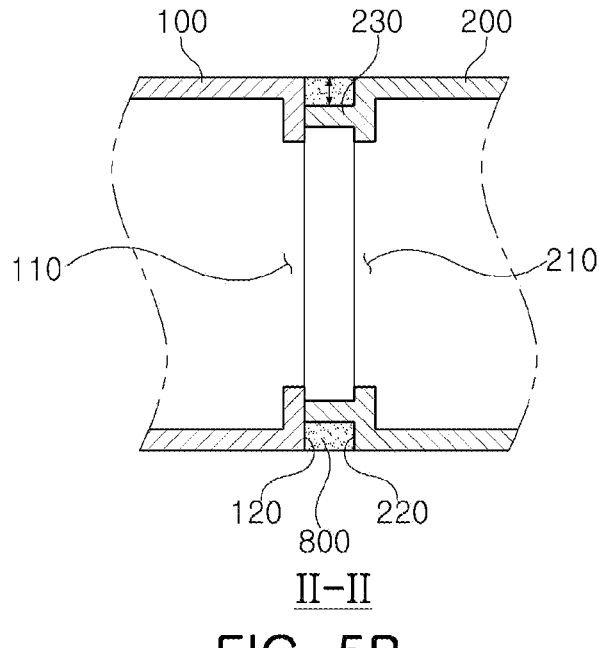

A coupled form of the camera module 10, according to an example, will be described with reference to FIGS. 4 to 5B.

The camera module 10 may include the first body 100 and the second body 200. The first body 100 and the second body 200 may be disposed in a direction intersecting the optical axis C1. The first body 100 and the second body 200 may be connected. For example, the first body 100 and the second body 200 may be firmly coupled together by an adhesive member 800.

A space in which the adhesive member 800 may be filled or injected may be formed between the first body 100 and the second body 200. For example, a considerable space may be formed between the first coupling portion 120 of the first body 100 and the second coupling portion 220 of the second body 200, as illustrated in FIGS. 5A and 5B. The aforementioned space may be formed by the first coupling portion 120, the second coupling portion 220, and the protrusion 230. For example, the space in which the adhesive member 800 is accommodated may be surrounded by the first coupling portion 120, the second coupling portion 220, and the protrusion 230.

The protrusion 230 may be configured to spatially connect the first window 110 of the first body 100 and the second window 210 of the second body 200 to each other. Accordingly, light projected through the first window 110 may be incident on the image sensor 610 through the second window 210 without any interference. The protrusion 230 may be configured to block the inflow of the adhesive member 800. For example, the protrusion 230 is formed outside of the first window 110 and the second window 210 to block the adhesive member 800 from extending through the first window 110 and the second window 210.

In the camera module 10 configured as described above, since the first body 100 and the second body 200 are formed to extend lengthwise in the optical axis C2 direction of the lens module 300, an optical imaging system having a long focal length may be implemented. In addition, in the camera module 10, since the coupling between the first body 100 and the second body 200 is formed by the adhesive member 800 having a predetermined curing time, optical axis alignment between the first body 100 and the second body 200 may be possible even in the bonding state of the first body 100 and the second body 200. In addition, in the camera module 10, since a considerable space for injection or filling of the adhesive member 800 is formed between the first body 100 and the second body 200, bonding reliability between the first body 100 and the second body 200 may be improved.

Next, camera modules according to other examples will be described with reference to FIGS. 6 to 9.

Figure 6:
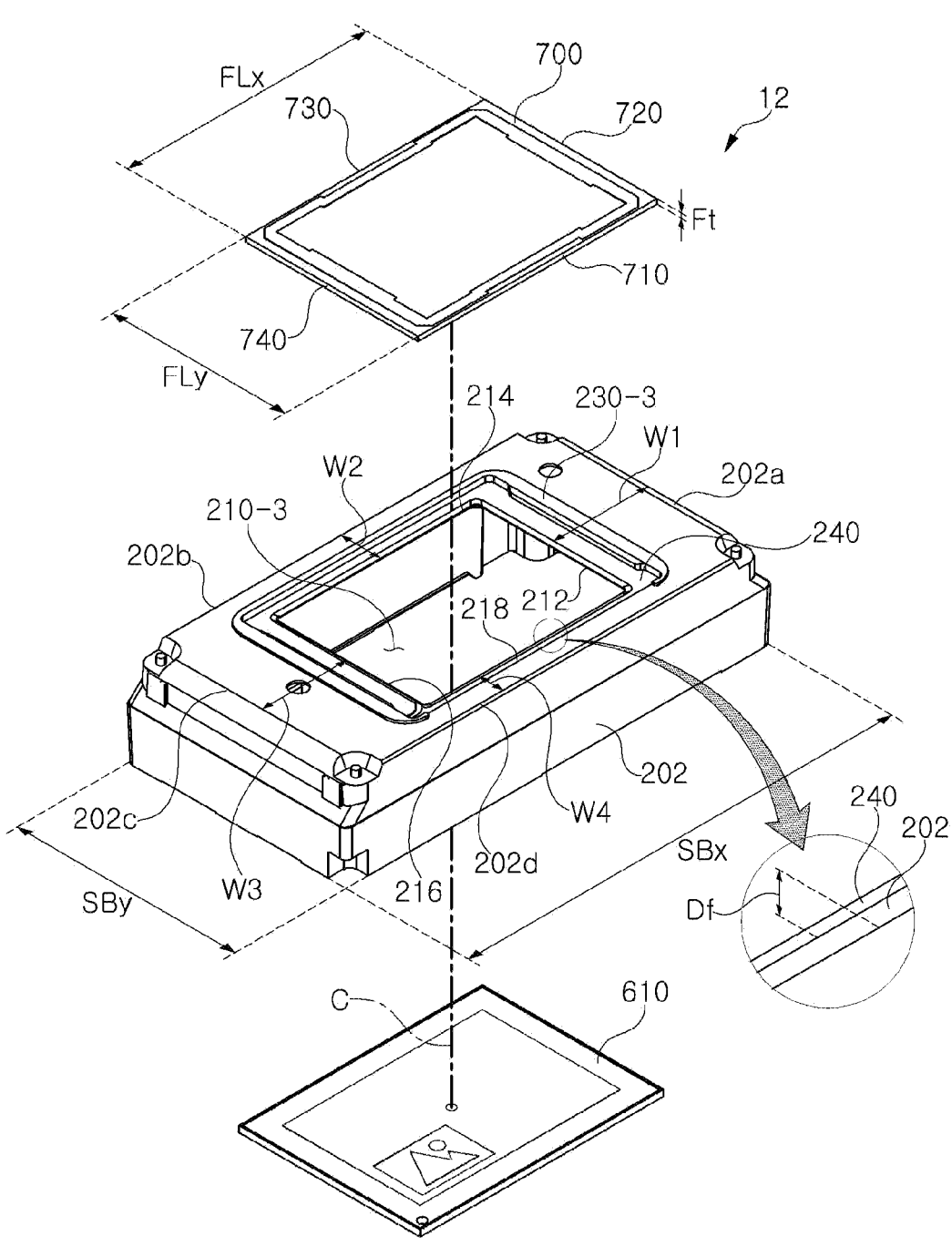
FIG. 6 is an exploded perspective view of a main configuration of a camera module, according to another example.
Figure 7:
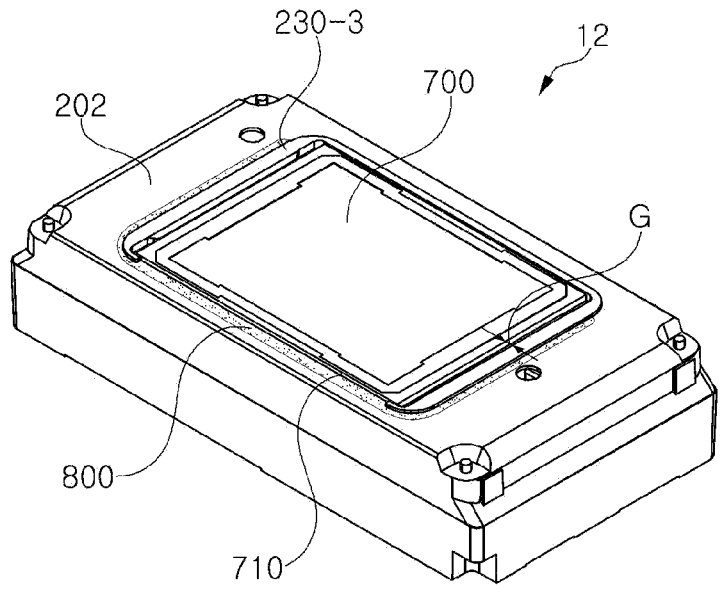
FIG. 7 is a perspective view of the main configuration illustrated in FIG. 6, when the main configuration is in an assembled state.
Figure 8:
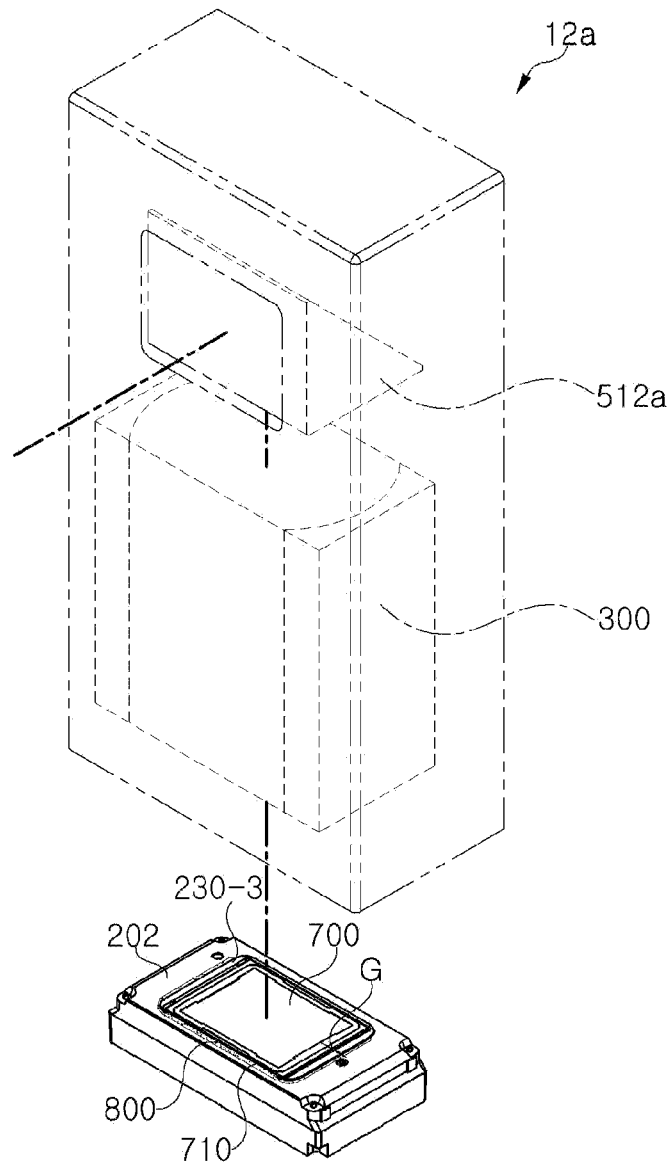
FIGS. 8 and 9 are drawings illustrating examples of a camera module including the main configuration illustrated in FIG. 7.
Figure 9:
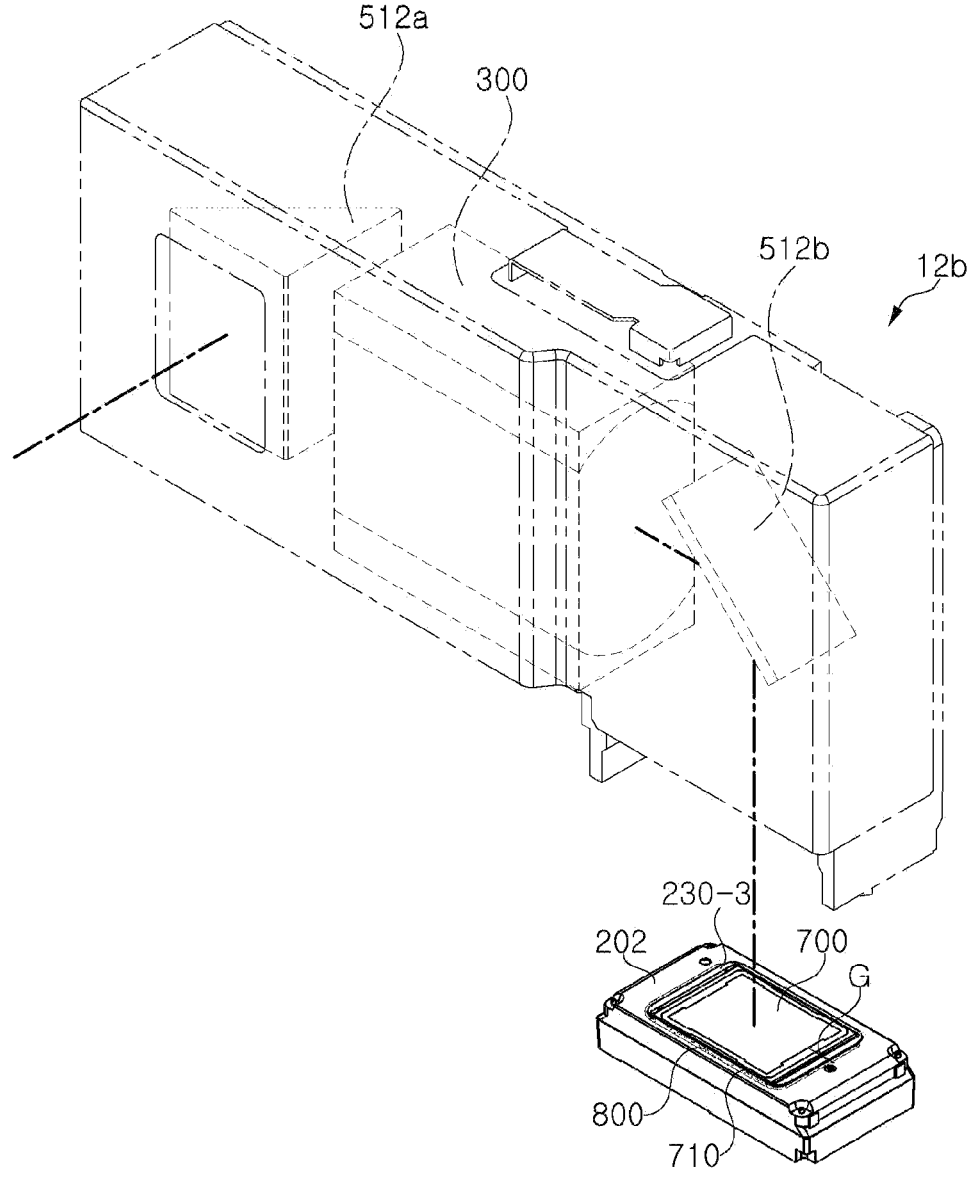
Figure 10:
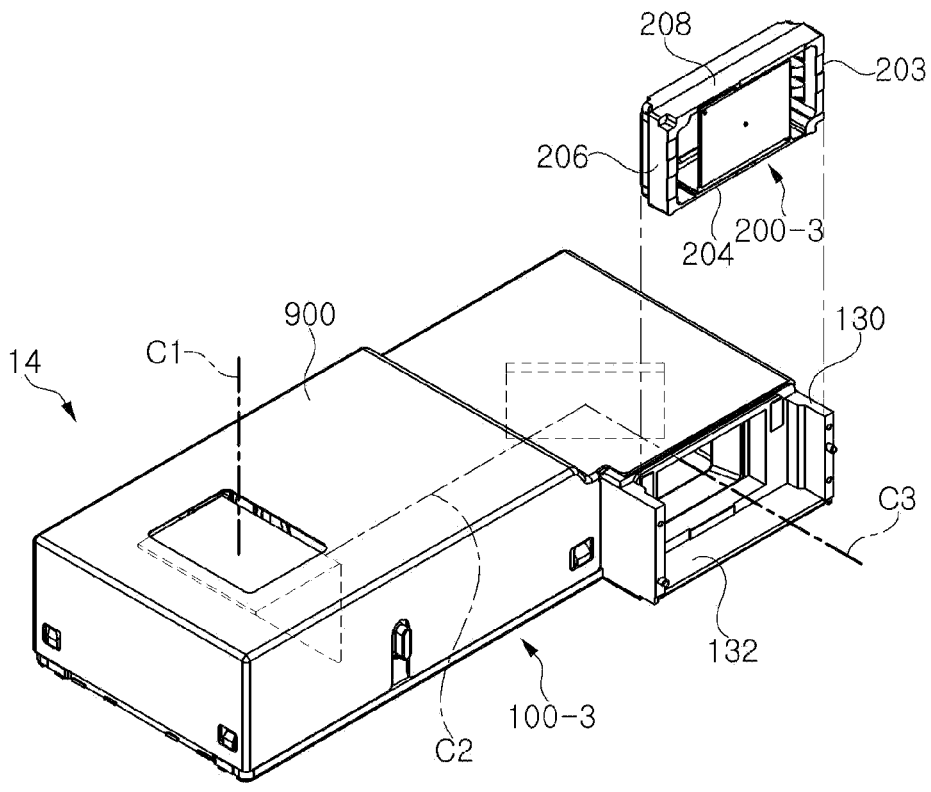
FIG. 10 is an exploded perspective view of a first body and a second body constituting a camera module, according to another example.

Referring to FIGS. 6 and 7, a camera module 12 may include a housing 202. For example, the camera module 12 may include the housing 202 configured to be coupled to a filter member 700. However, the configuration of the camera module 12 is not limited to the housing 202. For example, the camera module 12 may further include an optical path changing unit and a lens module as illustrated in FIGS. 8 and 9.

The housing 202 may be configured such that a length in a first direction intersecting the optical axis C and a length in a second direction intersecting the optical axis C are different. For example, a length SBx of the housing 202 in the first direction may be greater than a length SBy of the housing 202 in the second direction. The housing 202 may be configured to accommodate main components of the camera module 12. For example, the housing 202 may be configured to receive the image sensor 610. However, a component accommodated in the housing 202 is not limited to the image sensor 610. The housing 200 may be configured to enable the incident of light. For example, a window 210-3 may be formed on one surface of the housing 202 such that light refracted by the lens module may be projected to the image sensor 610.

The window 210-3 may be formed to have a substantially rectangular shape. For example, the lengths of a first side 212 and a third side 216 of the window 210-3 may be less than the lengths of adjacent second side 214 and fourth side 218. The window 210-3 may be formed to be biased toward one side of the housing 202. For example, the window 210-3 may be formed to be biased toward one side of the housing 202 in the second direction. For example, distances W1, W2 and W3 from the first side 212 to the third side 216 of the window 210-3 to edges 202a, 202b and 202c adjacent thereto may be greater than a distance W4 from a side 218 to a fourth side 202d-3 of the housing 202 adjacent thereto.

The image sensor 610 may be disposed inside the housing 202. The image sensor 610 may be formed to be biased toward one side of the housing 202. For example, the image sensor 610 may be formed to be biased toward one side of the housing 202 in the second direction.

The housing 202 may be configured to stably fix the position of the filter member 700. For example, a step 240 on which the filter member 700 is to be mounted may be formed on one surface of the housing 202. The step 240 may be formed along the edge of the window 210-3.

The housing 202 may be configured to reduce the phenomenon that the adhesive member is introduced through the window 210-1. For example, a protrusion 230-3 may be formed on one surface of the housing 202 along the edge of the window 210-3. The protrusion 230-3 may be configured to surround different sides of the filter member 700. For example, the protrusion 230-3 may be formed to surround a second side 720, a third side 730, and a fourth side 740 of the filter member 700. The protrusion 230-3 may be configured to open one side of the filter member 700 or a portion of the filter member 700. For example, the protrusion 230-3 may be configured to expose a significant portion of the first side 710 of the filter member 700 to the outside thereof.

The filter member 700 may be disposed in the housing 202. For example, the filter member 700 may be disposed on one surface of the housing 202 on which the window 210-3 is formed. The filter member 700 may be disposed to close the window 210-3. For example, the filter member 700 may be sized to completely cover the window 210-3 of the housing 202 such that foreign substances or the adhesive member do not flow through the window 210-3.

The filter member 700 may be configured such that a length in a first direction intersecting the optical axis C and a length in a second direction intersecting the optical axis C are different. For example, a length FLx of the filter member 700 in the first direction may be greater than a length FLy of the filter member 700 in the second direction.

The filter member 700 may be stably positioned on one surface of the housing 202. For example, the filter member 700 may be disposed on the step 240 of the housing 200-3 to stably maintain a coupling position with the housing 202. The filter member 700 may be disposed to be biased toward one side of the housing 202. For example, the filter member 700 may be disposed to be biased toward one side of the housing 202 in the second direction. For example, the distance from the first side 710 of the filter member 700 to the fourth edge 202d-3 of the housing 202 may be less than the distance from the third side 730 of the filter member 700 to the second edge 202b of the housing 202. The distance from the second side 720 of the filter member 700 to the first edge 202*a* of the housing 202 may be substantially equal to the distance from the fourth side 740 of the filter member 700 to the third edge 202*c*-3 of the housing 202. As another example, the distance from the first side 710 of the filter member 700 to the fourth edge 202*d* of the housing 202 may be less than the distance from the second side 720 to the fourth side 740 of the filter member 700 to the edges 202*a*, 202*b* and 202*c* of the housing 202 adjacent thereto.

Like the protrusion 230-3, the filter member 700 may be configured to block the inflow of the adhesive member 800. For example, the first side 710 of the filter member 700 may function as a structure for blocking the adhesive member 800 from flowing into the inside of the window 210-3. The filter member 700 may be formed to have a predetermined thickness Ft. For example, the thickness Ft of the filter member 700 may be greater than a depth Df, which is the depth from one surface (e.g., a front surface) of the housing 202 to the bottom surface of the step 240) of the step 240. A deviation between the thickness Ft of the filter member 700 and the depth Df of the step 240 may be maintained to be 50 μm or less. If the deviation between the thickness Ft of the filter member 700 and the depth Df of the step 240 exceeds 50 μm, the downsizing or thinning of the camera module 12 may be hindered due to the thickness of the filter member 700.

The adhesive member 800 may be applied to the one surface 202 of the housing 202. The adhesive member 800 may be configured to combine the housing 202 and other components of the camera module 12 or to reduce a flare phenomenon. For example, the adhesive member 800 may be configured to bond the housing 202 and the body of the camera module 12. As another example, the adhesive member 800 may be applied to the first side 710 of the filter member 700 to block the inflow of light through the first side 710 of the filter member 700.

A camera module may have a form illustrated in FIGS. 8 and 9. As an example, a camera module 12*a* may further include a first optical path changing unit 512*a* and a lens module 300, as illustrated in FIG. 8. As another example, a camera module 12*b* may include of the first optical path changing unit 512*a*, a second optical path changing unit 512*b*, and the lens module 300, as illustrated in FIG. 9.

Hereinafter, a camera module according to another example will be described with reference to FIGS. 10 to 17B.

Referring to FIGS. 10 to 17B, a camera module 14 according to an example may include a first body 100-3 and a second body 200-3. However, the configuration of the camera module 14 is not limited to the first body 100-3 and the second body 200-3. For example, the camera module 14 may further include a shielding member 900 configured to cover an open surface of the first body 100-3 and a side surface of the first body 100-3.

The first body 100-3 and the second body 200-3 are configured to be coupled together. For example, the first body 100-3 and the second body 200-3 may be coupled by a fastening part such as a protrusions and a groove. However, the coupling structure between the first body 100-3 and the second body 200-3 is not limited to fastening by means of protrusions and grooves. For example, the first body 100-3 and the second body 200-3 may be firmly coupled by an adhesive member.

The first body 100-3 may include a configuration for accommodating the second body 200-3. For example, a receiving portion 130 for accommodating the second body 200 may be formed on one side of the first body 100-3. The receiving portion 130 may be configured to limit the position of the second body 200-3 with respect to the first body 100. For example, the receiving portion 130 may be configured to contact different sides 203, 204 and 206 of the second body 200-3. For example, the receiving portion 130 is formed to surround the three side surfaces 203, 204 and 206 of the second body 200-3 to contact the three side surfaces 203, 204 and 206, while not contacting a fourth side surface 208 of the second body 200-3. However, an inner surface 132 of the receiving portion 130 is not necessarily configured to contact the three side surfaces 203, 204 and 206 of the second body 200-3. For example, the inner surface 132 of the receiving portion 130 may be formed to have a predetermined distance from the three side surfaces 203, 204 and 206 of the second body 200.

Figure 11:
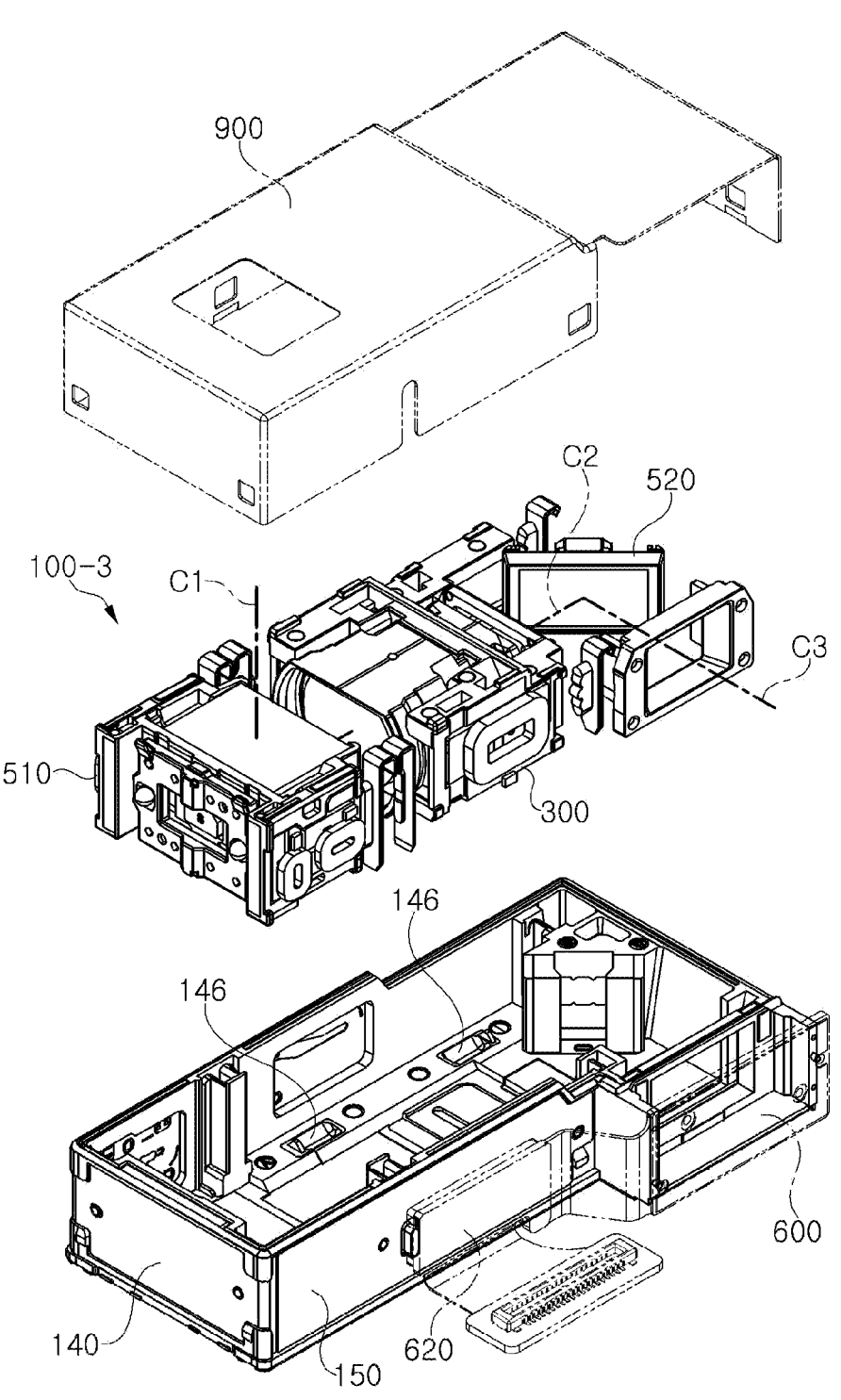
FIG. 11 is a partially exploded perspective view of the first body illustrated in FIG. 10.

The first body 100-3 of the camera module 14 will be described in detail with reference to FIG. 11.

The first body 100-3 may be configured to accommodate main components of the camera module 14. For example, the first body 100-3 may be configured to accommodate the lens module 300, a first optical path conversion module 510, and a second optical path conversion module 520.

The first body 100-3 may include a configuration for accommodating the lens module 300, the first optical path conversion module 510, and the second optical path conversion module 520. For example, the first body 100 may include a first housing 140. The first housing 140 may be formed of a material having a predetermined rigidity. For example, the first housing 140 may be formed of a metal material. However, the material of the first housing 140 is not limited to metal. For example, to reduce the weight of the camera module 14, the first housing 140 may also be formed of a plastic material.

The first optical path conversion module 510, the lens module 300, and the second optical path conversion module 520 may be sequentially disposed in the first housing 140. In detail, the first optical path conversion module 510 may be disposed on the object side of the lens module 300, and the second optical path conversion module 520 may be disposed on the image side of the lens module 300. A circuit board 150 may be disposed on the first housing 140. For example, the circuit board 150 may be configured to supply electrical signals and currents necessary for driving the first optical path conversion module 510 and the lens module 300, and may be disposed on an outer perimeter of the first housing 140.

The first housing 140 may include a configuration enabling the lens module 300 to be driven. For example, a guide groove 146 enabling the lens module 300 to move in one direction may be formed in the bottom of the first housing 140. For reference, although not illustrated in FIG. 10, a ball bearing similar to the ball bearings illustrated in FIG. 12 may be disposed in the guide groove 146 to reduce frictional resistance between the first housing 140 and the lens module 300.

The first optical path conversion module 510 may be configured to convert a path of light incident in the camera module 14. For example, the first optical path conversion module 510 may be configured to reflect or refract the path of light incident along a first optical axis C1 in the direction of a second optical axis C2, intersecting the first optical axis C1.

The lens module 300 may be configured to form an image of light incident in the camera module 14 on the image sensor. For example, the lens module 300 may include one or more lenses. The lens module 300 may be configured to enable autofocusing (AF) or focus magnification adjustment (Zoom) of the camera module 14. For example, the lens module 300 may move in the second optical axis C2 direction.

The second optical path conversion module 520 may be configured to convert the optical path of light emitted from the lens module 300. For example, the second optical path conversion module 520 may be configured to reflect or refract the path of light emitted along the second optical axis C2 in the direction of a third optical axis C3, intersecting the second optical axis C2.

The first body 100-3 may further include a configuration in addition to the above-described configuration, or may be configured to have a coupling relationship with other configurations. For example, a substrate 600 on which an image sensor is mounted and a connection substrate 620 connected to the circuit board 150 may be additionally disposed on one side of the first body 100-3.

Figure 12:
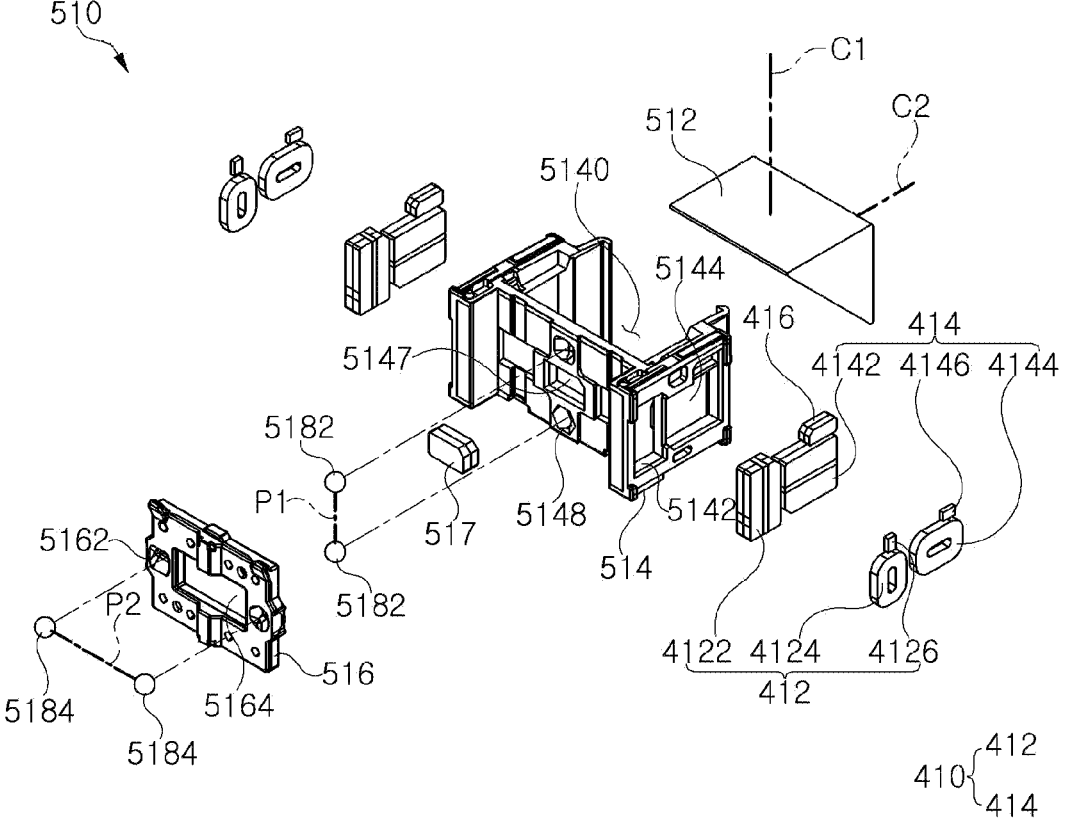
FIG. 12 is an exploded perspective view of a first optical path conversion module illustrated in FIG. 11.

Next, the first optical path conversion module 510 will be described with reference to FIG. 12.

The first optical path conversion module 510 may include the first optical path changing unit 512. The first optical path changing unit 512 may be configured to change the optical path. For example, the first optical path changing unit 512 may reflect or refract the path of light incident along the first optical axis C1 in the second optical axis C2 direction. The first optical path changing unit 512 may be configured as a prism or a reflective mirror. However, the shape of the first optical path changing unit 512 is not limited to a prism and a reflective mirror. For example, the first optical path changing unit 512 may also be configured in a different form in a range in which light may be refracted or reflected.

The first optical path conversion module 510 may include a first movable member 514 and a second movable member 516. In addition, the first optical path conversion module 510 may further include a first driving unit 410.

The first movable member 514 may be coupled to the first optical path changing unit 512. For example, one surface of the first movable member 514 may include a receiving portion 5140 configured to accommodate the first optical path changing unit 512. The first movable member 514 may be coupled to the second movable member 516. For example, the second movable member 516 may be disposed on the rear surface of the first movable member 514. A ball bearing 5182 may be disposed between the first movable member 514 and the second movable member 516. For example, the ball bearing 5182 may be accommodated in a groove 5148 formed in the rear surface of the first movable member 514. The groove 5148 may be formed in a shape other than a hemisphere. For example, the groove 5148 may be formed to have a form in which a hexagonal pyramid, a quadrangular pyramid, a truncated hexagonal pyramid, or a truncated quadrangular pyramid shape is engraved in the first movable member 514. Since the groove 5148 having the above-described shape has a relatively small area (point contact or line contact) substantially in contact with the ball bearing 5182, the rotational movement of the ball bearing 5182 may be smooth.

The first movable member 514 may be rotatable. For example, the first movable member 514 may be rotated based on two ball bearings 5182 respectively disposed in two grooves 5148. For example, the first movable member 514 may be rotated about an imaginary axis P1 connecting the centers of the ball bearings 5182.

The first movable member 514 may be coupled to the first driving unit 410. For example, receiving portions 5142 and 5144 for accommodating some components of the first driving unit 410 may be formed on both sides of the first movable member 514. The receiving portions 5142 and 5144 may be formed to have different sizes. For example, the second receiving portion 5144 may be formed to have a larger size than the first receiving portion 5142. However, the receiving portions 5142 and 5144 are not limited to the above-described size relationship or the shapes illustrated in FIG. 7.

A magnet 517 may be disposed on the rear surface of the first movable member 514. The magnet 517 may be firmly fitted to a fixing groove 5147 formed on the rear surface of the first movable member 514, so as not to be separated therefrom. The magnet 517 may be configured to prevent separation and position change of the first movable member 514. The magnet 517 exerts attractive force with a yoke (not illustrated) of the first housing 140 to reduce a phenomenon in which the position of the first movable member 514 is changed or the first movable member 514 is separated from the first housing 140.

The second movable member 516 may be configured such that the first movable member 514 may smoothly rotate. For example, the second movable member 516 may be disposed on the rear surface of the first movable member 514 to stably support the ball bearing 5182, which is the center of the rotational movement of the first movable member 514.

The second movable member 516 may be configured to be able to rotate. For example, the second movable member 516 may be rotated based on the two ball bearings 5184 disposed in a groove 5162. In more detail, the second movable member 516 may be rotated about an imaginary axis P2 connecting the centers of the ball bearings 5184.

The first driving unit 410 may be configured to provide driving force necessary for the rotational movement of the first optical path changing unit 512. For example, the first driving unit 410 may provide driving force necessary for the rotational movement of the first movable member 514 or provide driving force necessary for the rotational movement of the second movable member 516.

The first driving unit 410 may include a first driving unit portion 412 and a second driving unit portion 414. The first driving unit portion 412 may provide driving force necessary for the rotational movement of the first movable member 514, and the second driving unit portion 414 may provide the driving force necessary for the rotational movement of the second movable member 516. However, the configuration of the first driving unit 410 is not limited to including the first driving unit portion 412 and the second driving unit portion 414. For example, the first driving unit 410 may further include a magnetic body 416 for generating magnetic force of a predetermined magnitude.

The first driving unit portion 412 may include a driving magnet 4122 and a driving coil 4124. However, the configuration of the first driving unit portion 412 is not limited to the driving magnet 4122 and the driving coil 4124. For example, the first driving unit portion 412 may further include a first detection sensor 4126. The driving magnet 4122 may be disposed on the first movable member 514, and the driving coil 4124 may be disposed on the first housing 140. In detail, the driving magnet 4122 is disposed in the receiving portion 5142 formed on the side surface of the first movable member 514, and the driving coil 4124 may be disposed on one surface of the circuit board 15 or the housing 140, facing the driving magnet 4122.

The second driving unit portion 414 may include a driving magnet 4142 and a driving coil 4144. However, the configuration of the second driving unit portion 414 is not limited to the driving magnet 4142 and the driving coil 4144. For example, the second driving unit portion 414 may further include a first detection sensor 4146. The driving magnet 4142 may be disposed on the first movable member 514, and the driving coil 4144 may be disposed on the first housing 140. For example, the driving magnet 4142 may be disposed in the receiving portion 5144 formed on the side surface of the first movable member 514, and the driving coil 4144 may be disposed on one surface of the circuit board 150 or the first housing 140, facing the driving magnet 4142.

The first optical path conversion module 510 configured as described above may perform optical image stabilization of the camera module 14. For example, the first optical path conversion module 510 rotates the first movable member 514 through the driving force of the first driving unit 412 or rotates the second movable member 516 through the driving force of the second driving unit 414, thereby finely adjusting the path of light incident through the first optical path changing unit 512. In addition, the first optical path conversion module 510 detects the position of the first optical path changing unit 512 through the detection sensors 4126 and 4146 configured to detect the magnetic force of the magnetic body 416, and may adjust the position of the first optical path changing unit 512 based on the detected position information.

Figure 13:
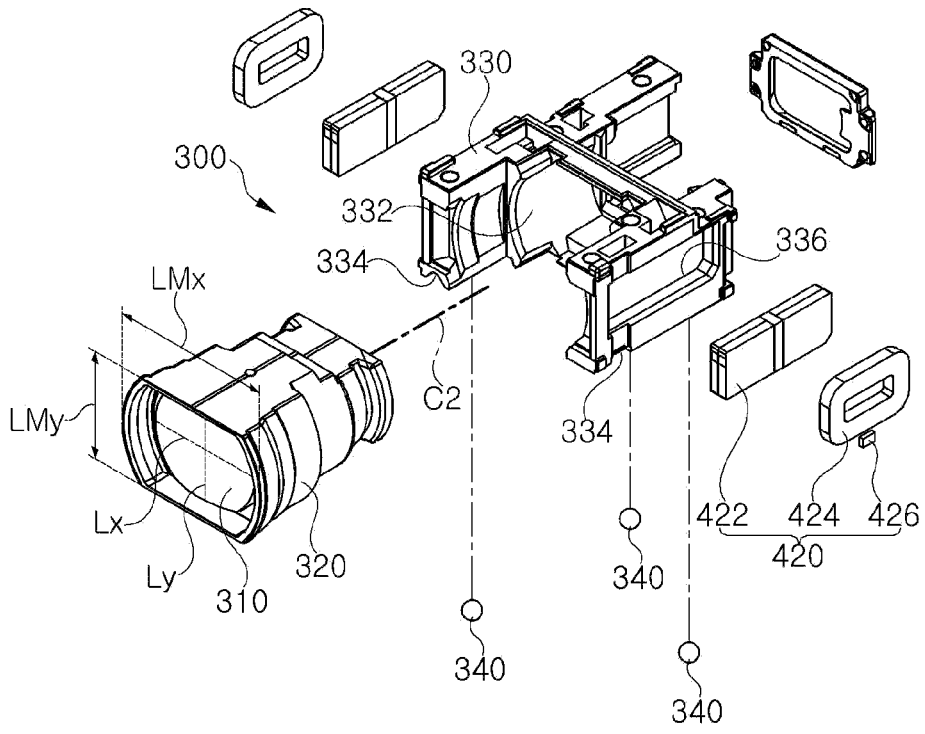
FIG. 13 is an exploded perspective view of a lens module illustrated in FIG. 11.

Next, the lens module 300 will be described with reference to FIG. 13.

The lens module 300 may include a lens 310, a lens barrel 320, and a barrel holder 330. However, the configuration of the lens module 300 is not limited thereto. For example, the lens module 300 may be configured to further include a member in addition to the above-described configuration or may be configured to be coupled with other members. For example, the lens module 300 may further include a second driving unit 420.

The lens module 300 may be configured to facilitate thinning of the camera module 14. For example, the lens 310 may be formed to have a length Lx in the first direction intersecting the second optical axis C2 and a length Ly in the second direction intersecting the second optical axis C2, the length Lx and the length Ly being different from each other. As another example, the lens barrel 320 may be formed to have a length LMx in the first direction intersecting the second optical axis C2 and a length LMy in the second direction intersecting the second optical axis C2, the length LMx and the length LMy being different from each other.

The lens module 300 may include one or more lenses 310. For example, the lens module 300 may include four or more lenses 310. However, the number of lenses constituting the lens module 300 is not limited to four.

The lens barrel 320 is configured to receive the of lense(s) 310. For example, the lens barrel 320 may be configured to accommodate all lenses included in the camera module 14.

The barrel holder 330 may be configured to be coupled to the lens barrel 320. For example, the barrel holder 330 may include a receiving portion 332 for accommodating a portion of the lens barrel 320 or a considerable portion of the lens barrel 320. The barrel holder 330 is configured to support the lens barrel 320. For example, the barrel holder 330 may support the lens barrel 320 such that the lens barrel 320 is stably positioned inside of the first housing 140. The barrel holder 330 may be configured to be movable in the direction of the second optical axis C2. For example, the barrel holder 330 may move in the direction of the second optical axis C2 inside of the first housing 140 via a ball bearing 340 fitted in a groove 334.

The second driving unit 420 may provide driving force necessary for linear motion of the barrel holder 330. For example, the second driving unit 420 may move the barrel holder 330 in the direction of the second optical axis C2 by using magnetic force. However, the driving force of the second driving unit 420 is not limited to the magnetic force.

The second driving unit 420 may include a driving magnet 422 and a driving coil 424. However, the configuration of the second driving unit 420 is not limited to the driving magnet 422 and the driving coil 424. For example, the second driving unit 420 may further include a position detection sensor 426. The driving magnet 422 and the driving coil 424 may be disposed on the barrel holder 330 and the first housing 140. For example, the driving magnet 422 may be disposed on a mounting portion 336 of the barrel holder 330, and the driving coil 424 may be disposed on one surface of the first housing 140 or one surface of the circuit board 150, substantially facing the driving magnet 422.

The lens module 300 configured as described above may move in the second optical axis C2 direction through the driving force of the second driving unit 420, and may enable autofocusing (AF) or focus magnification adjustment (zoom) of the camera module 14. In addition, since the length of the lens module 300 according to this example in the second direction intersecting the second optical axis C2 is less than the length in the first direction, the thickness of the camera module 14 may be reduced.

Figure 14:
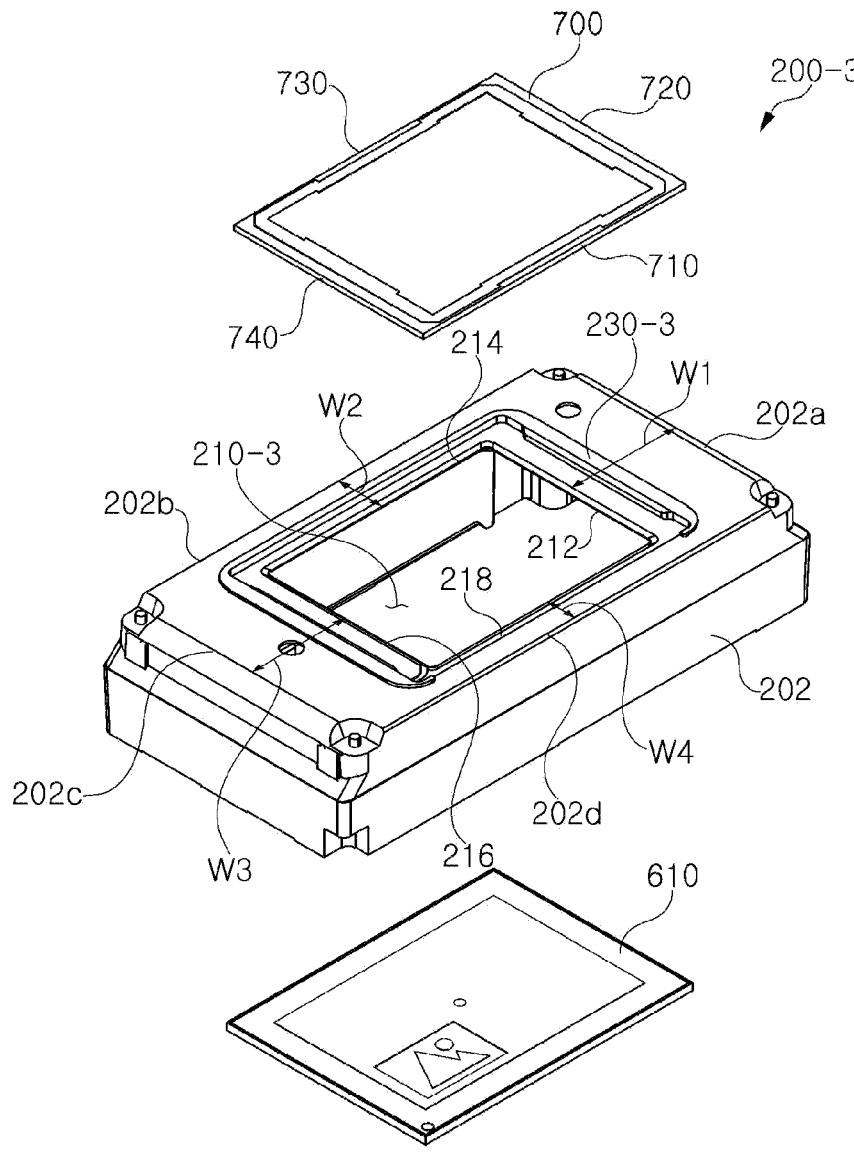
FIG. 14 is an exploded perspective view of the second body illustrated in FIG. 10.
Figure 15:
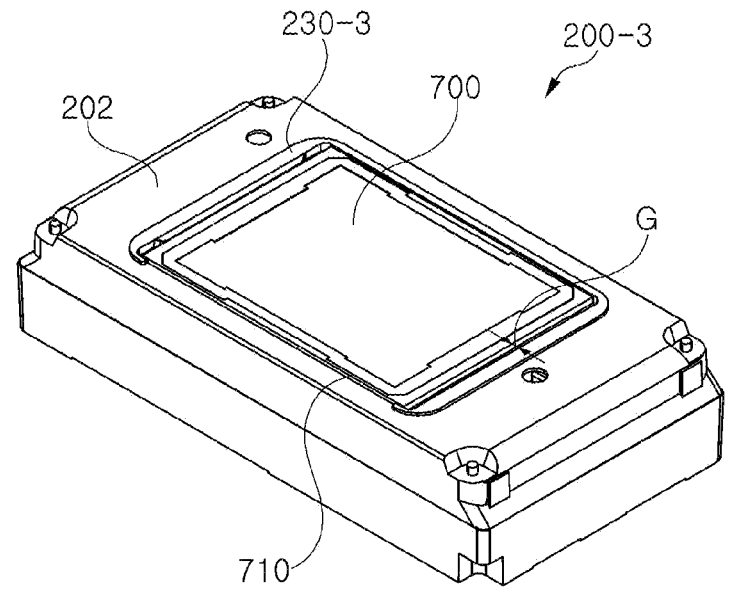
FIG. 15 is a combined perspective view of the second body illustrated in FIG. 14.

Next, the second body 200-3 will be described with reference to FIGS. 14 and 15.

The second body 200-3 may include a second housing 202. The second housing 202 corresponds to the housing 202 described above with respect to FIGS. 6-9. However, the configuration of the second body 200 is not limited to the second housing 202. For example, the second body 200-3 may further include the image sensor 610 and the filter member 700.

The second housing 202 may include a configuration for enabling the incidence of light reflected or refracted by the second optical path conversion module 520. For example, the window 210-3 may be formed in the second housing 202. The window 210-3 may be formed to have a shape similar to that of the image sensor 610. For example, the window 210-3 may be formed to have a rectangular shape. However, the shape of the window 210-3 is not limited to a rectangular shape.

The window 210-3 may be formed to be biased toward one side of the second housing 202. For example, a distance W1 from a first side 212 of the window 210 to a first edge 202*a* of the second housing 202 may be substantially equal to a distance W3 from the third side 216 of the window 210 to the third edge 202*c* of the second housing 202, but a distance W2 from the second side 214 of the window 210-3 to the second edge 202*b* of the second housing 202 may be different from a distance W4 from the fourth side 218 of the window 210 to the fourth edge 202*d* of the second housing 202. For example, the distance W4 from the fourth side 218 of the window 210 to the fourth edge 202*d* of the second housing 202 may be less than the distances W1, W2 and W3 from the first side 212 to the third side 216 of the window 210-3 to the first edge 202*a* to the third edge 202*c* of the second housing 202.

The protrusion 230-3 may be formed on the second housing 202. In more detail, the protrusion 230-3 may be formed along the first side 212 to the third side 216 of the window 210. The protrusion 230-3 may be configured to block foreign substances or an adhesive member from penetrating toward the window 210-3. For example, the protrusion 230-3 may be formed to have a predetermined height to reduce or prevent a phenomenon in which foreign substances or the adhesive member are introduced through the window 210-3.

The filter member 700 may be disposed on the second housing 202. The filter member 700 may be configured to completely close the window 210-3. Accordingly, the filter member 700 may block the penetration of foreign substances or the adhesive member into the window 210-3. The filter member 700 may be configured to block light of a specific wavelength. For example, the filter member 700 may be configured to block infrared rays. However, the wavelength blocked by the filter member 700 is not limited to infrared rays. The filter member 700 may be disposed on the inside side of the protrusion 230-3. For example, three sides 720, 730 and 740 of the filter member 700 may be closed by the protrusion 230. One side 710 of the filter member 700 may be configured to be exposed externally. For example, the first side 710 of the filter member 700 may be exposed to the outside without being closed by the protrusion 230-3. A predetermined space may be formed between the filter member 700 and the protrusion 230-3. For example, a space G for collecting foreign substances or an adhesive member may be formed between the three sides 720, 730 and 740 of the filter member 700 and the protrusion 230-3. However, the space G is not always formed between the three sides 720, 730 and 740 of the filter member 700 and the protrusion 230-3. For example, the space G may be omitted if necessary.

Figure 16:
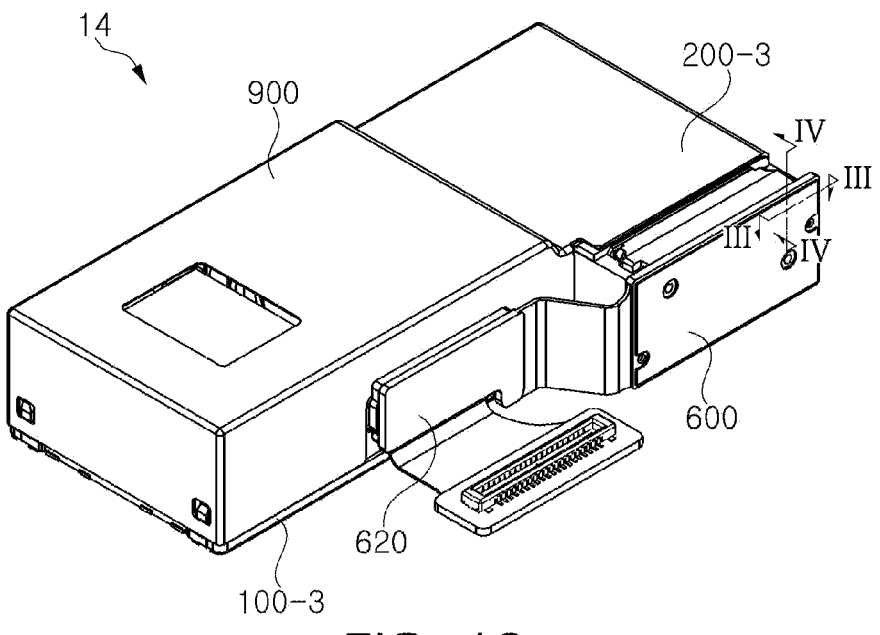
FIG. 16 is a combined perspective view of the camera module illustrated in FIG. 10.

The above-described components may be integrally combined through a predetermined process to configure the camera module 14 of the form illustrated in FIG. 16. The camera module 14 includes the first body 100-3 and the second body 200-3 as described above. The camera module 14 may further include the shielding member 900 to significantly reduce the influence of an external shock or an external magnetic field. The shielding member 900 may be configured to surround a significant portion of the first body 100-3.

The camera module 14 may further include a configuration to be connected to an external signal and an external power source. For example, the camera module 14 may further include the substrate 600 and a connection substrate 630.

Figure 17A:
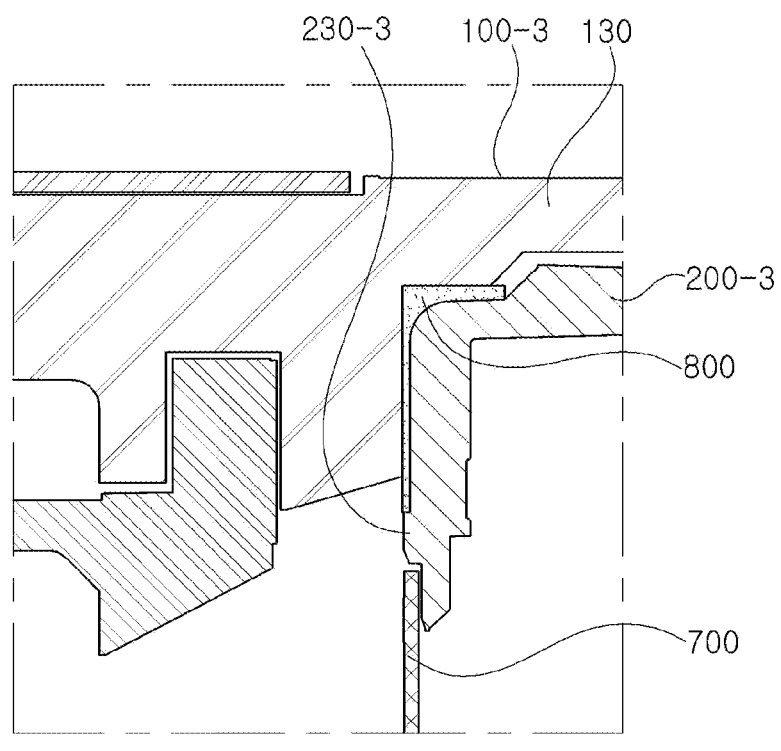
FIGS. 17A and 17B are cross-sectional views of the camera module illustrated in FIG. 16.
Figure 17B:
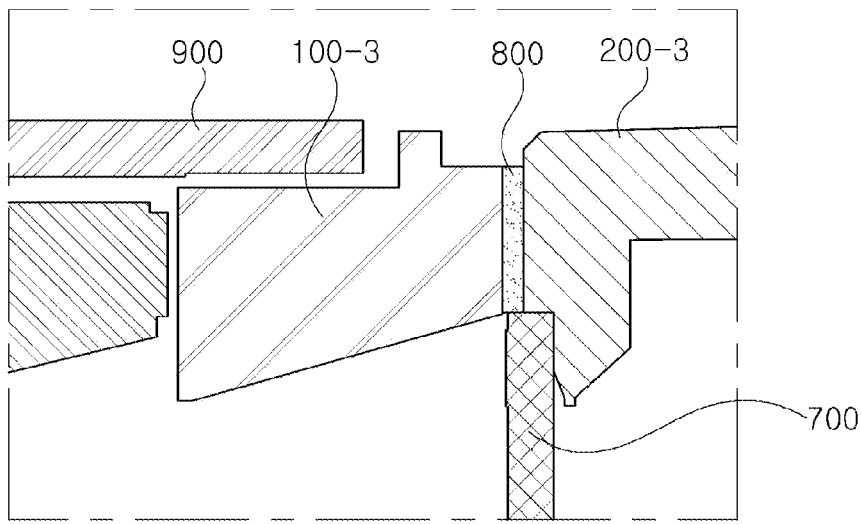

The camera module 14 may further include a configuration that enables firm coupling between the first body 100-3 and the second body 200-3. For example, the camera module 14 may further include the adhesive member 800 as illustrated in FIGS. 17A and 17B. The adhesive member 800 may be formed between the first body 100-3 and the second body 200-3. The protrusion 230-3 and the filter member 700 may prevent a phenomenon in which the adhesive member 800 invades or flows into the window 210-3. For example, the protrusion 230-3 and the filter member 700 may contact a portion of the first body 100 to completely close a gap through which the adhesive member 800 may invade or flow. Accordingly, according to this example, contamination of the lens or the image sensor due to the inflow of the adhesive member 800 may be reduced.

As set forth above, according to examples, performance degradation of a camera module due to an inflow of adhesive may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing including a window through which light is incident and disposed on one surface of the housing, wherein a length of the housing in a first direction intersecting an optical axis is greater than a length of the housing in a second direction intersecting the optical axis;
   a filter member disposed on the window;
   an adhesive member in contact with one side of the filter member; and
   a protrusion surrounding a second side of the filter member which is opposite to the one side of the filter member and not in contact with the adhesive member,
   wherein the protrusion is configured to prevent inflow of the adhesive member,
   wherein a portion of the adhesive member is disposed on the outside of the protrusion,
   wherein the housing includes a step having mutually perpendicular inner surfaces, a first of the inner surfaces facing and parallel to a bottom surface of the filter member, and a second of the inner surfaces facing and parallel to a side surface of the filter member,
   wherein a top surface of the filter member is higher than a top surface of the housing in an optical axis direction, and
   wherein a thickness of the filter member in the optical axis direction is greater than a depth of the inner surface of the step in the optical axis direction.

2. The camera module of claim 1, wherein the filter member is disposed biased toward one side of the housing in the second direction with respect to the window.

3. The camera module of claim 1, wherein the window is disposed biased toward one side of the housing in the second direction.

4. The camera module of claim 1, further comprising a first optical path changing unit configured to refract or reflect light reflected from a subject to a lens module.

5. The camera module of claim 4, further comprising a second optical path changing unit configured to refract or reflect light refracted through the lens module toward the window.

6. The camera module of claim 1, wherein a deviation between the thickness of the filter member and the depth of the step in the optical axis direction is 50 μm or less.

7. The camera module of claim 1,
   wherein the housing includes a step on which the filter member is configured to be seated, and
   wherein a deviation between a thickness of the filter member and a depth of the step in the optical axis direction is 50 μm or less.

8. A camera module, comprising:
   a housing including a window through which light is incident and disposed on one surface of the housing, wherein a length of the housing in a first direction intersecting an optical axis is greater than a length of the housing in a second direction intersecting the optical axis;

a filter member disposed on the window;

an adhesive member configured to contact one side of the filter member; and a protrusion surrounding a second side of the filter member which is opposite to the one side of the filter member not in contact with the adhesive member, wherein the protrusion is configured to prevent inflow of the adhesive member, wherein the housing includes a step on which the filter member is configured to be seated, wherein a thickness of the filter member in an optical axis direction is greater than a depth of the step in the optical axis direction, and wherein a deviation between the thickness of the filter member and the depth of the step in the optical axis direction is 50 μm or less.

9. A camera module, comprising:

a first body including a lens module, a first optical path conversion module disposed on an object side of the lens module, and a second optical path conversion module disposed on an image side of the lens module;

a second body connected to the first body and having a window through which light projected from the first body is incident;

a filter member disposed on the window;

a protrusion disposed on the second body and configured to surround a portion of the filter member except for one side of the filter member; and an adhesive member disposed on the one side of the filter member, wherein the second body includes a step having mutually perpendicular inner surfaces, a first of the inner surfaces facing and parallel to a bottom surface of the filter member, and a second of the inner surfaces facing and parallel to a side surface of the filter member, wherein a top surface of the filter member is higher than a top surface of the second body in an optical axis direction, wherein a thickness of the filter member in the optical axis direction is greater than a depth of the inner surface of the step in the optical axis direction, wherein the protrusion is configured to prevent inflow of the adhesive member, and wherein a portion of the adhesive member is disposed on the outside of the protrusion.

10. The camera module of claim 9, further comprising a receiving portion disposed on the first body and disposed to surround three different sides of the second body.

11. The camera module of claim 9, further comprising a shielding member coupled to the first body.

12. The camera module of claim 9, further comprising a substrate disposed on the second body and including an image sensor.

13. The camera module of claim 9, further comprising a first driving unit configured to drive the first optical path conversion module.

14. The camera module of claim 9, further comprising a second driving unit configured to drive the lens module in the optical axis direction of the lens module.

15. The camera module of claim 9, wherein the adhesive member is further disposed between the first body and the second body.

16. The camera module of claim 9, wherein the adhesive member is further disposed in a space defined between the protrusion and opposing surfaces of the first body and the second body.

17. A camera module, comprising:

a housing including a window through which light is incident and disposed on one surface of the housing;

a filter member disposed on the window;

an adhesive member configured to contact a first side of the filter member; and a protrusion surrounding a second side of the filter member which is opposite to the first side of the filter member not in contact with the adhesive member, wherein the housing includes a step having mutually perpendicular inner surfaces, a first of the inner surfaces facing and parallel to a bottom surface of the filter member, and a second of the inner surfaces facing and parallel to a side surface of the filter member, wherein a top surface of the filter member is higher than a top surface of the housing in an optical axis direction, wherein a thickness of the filter member in the optical axis direction is greater than a depth of the inner surface of the step in the optical axis direction, wherein the protrusion is configured to prevent inflow of the adhesive member, and wherein a portion of the adhesive member is disposed on the outside of the protrusion.

18. A camera module, comprising:

a housing including a window through which light is incident and disposed on one surface of the housing, wherein a length of the housing in a first direction intersecting an optical axis is greater than a length of the housing in a second direction intersecting the optical axis;

a filter member disposed on the window;

an adhesive member configured to contact one side of the filter member; and a protrusion surrounding a second side of the filter member which is opposite to the one side of the filter member not in contact with the adhesive member, wherein the protrusion is configured to prevent inflow of the adhesive member, wherein the housing includes a step on which the filter member is configured to be seated, and wherein a deviation between a thickness of the filter member and a depth of the step in the optical axis direction is 50 μm or less.

* * * * *